(12) United States Patent  
Zhang

(10) Patent No.: US 9,462,510 B2  
(45) Date of Patent: Oct. 4, 2016

(54) CIRCUIT SWITCHED FALLBACK HANDOVER METHOD AND APPARATUS, AND BASE STATION

(71) Applicant: Huawei Technologies Co., Ltd., Shenzhen, Guangdong (CN)

(72) Inventor: Qilong Zhang, Dar es Salaam (TZ)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/748,461

(22) Filed: Jun. 24, 2015

(65) Prior Publication Data

US 2015/0296423 A1    Oct. 15, 2015

Related U.S. Application Data

(63) Continuation of application No. PCT/CN2012/087913, filed on Dec. 28, 2012.

(51) Int. Cl.
*H04W 36/00* (2009.01)
*H04W 4/00* (2009.01)
(Continued)

(52) U.S. Cl.
CPC ....... *H04W 36/0022* (2013.01); *H04W 36/245* (2013.01); *H04W 36/385* (2013.01)

(58) Field of Classification Search
CPC  H04W 36/0022; H04W 36/14; H04W 48/16
USPC ............................ 455/436–444; 370/331–332
See application file for complete search history.

(56) References Cited

U.S. PATENT DOCUMENTS

2008/0085710 A1* 4/2008 Prateek ............... H04L 43/16  
                                                              455/436  
2008/0102834 A1    5/2008 Bernhard et al.  
(Continued)

FOREIGN PATENT DOCUMENTS

CN         102572985 A      7/2012  
CN         102598845 A      7/2012  
(Continued)

OTHER PUBLICATIONS

Antti Toskala, et al., "LTE Radio Protocols", LTE for UMTS: Evolution to LTE-Advanced, Mar. 4, 2011, 44 pages.

(Continued)

*Primary Examiner* — Dung Hong

(57) ABSTRACT

The present invention discloses a CSFB handover method and apparatus, and a base station, and belongs to the communications field. The method includes: receiving, by an base station, a CSFB indication; sending, by the base station after receiving the CSFB indication, a measurement control message to user equipment, where the measurement control message is used to instruct the user equipment to measure cell signal quality and send a corresponding event measurement report; and according to a receiving status of the event measurement report sent by the user equipment, selecting, by the base station, to complete CSFB handover by using blind handover, or selecting to complete CSFB handover by using measurement-based handover. In the present invention, according to a receiving status of an event measurement report sent by user equipment, blind handover is selected or measurement-based handover is selected to complete CSFB handover, thereby increasing a CSFB handover success probability.

13 Claims, 6 Drawing Sheets

(51) Int. Cl.
*H04W 36/24* (2009.01)
*H04W 36/38* (2009.01)

(56) References Cited

U.S. PATENT DOCUMENTS

| | | | |
|---|---|---|---|
| 2010/0316000 A1* | 12/2010 | Burbidge | H04W 36/0022 370/328 |
| 2011/0122809 A1 | 5/2011 | Yun et al. | |
| 2011/0263258 A1 | 10/2011 | Soliman et al. | |
| 2012/0122459 A1 | 5/2012 | Wu et al. | |
| 2012/0163249 A1 | 6/2012 | Chin et al. | |
| 2013/0051362 A1* | 2/2013 | Lee | H04W 36/30 370/331 |
| 2013/0301466 A1 | 11/2013 | Nenner | |
| 2014/0051443 A1* | 2/2014 | Diachina | H04W 36/0022 455/436 |
| 2015/0024754 A1 | 1/2015 | Axmon et al. | |
| 2015/0071252 A1 | 3/2015 | Faurie et al. | |

FOREIGN PATENT DOCUMENTS

| | | |
|---|---|---|
| EP | 2 487 800 A1 | 8/2012 |
| JP | 2014511585 A | 5/2014 |
| JP | 2014513491 A | 5/2014 |
| KR | 20090061071 A | 6/2009 |
| KR | 20110056230 A | 5/2011 |
| WO | WO 2011/053849 A2 | 5/2011 |
| WO | WO 2012/065010 A1 | 5/2012 |

OTHER PUBLICATIONS

"Considerations on CS fallback", LG Electronics Inc., 3GPP TSG-RAN WG2 RRC Adhoc, Jun. 5-6, 2008, 2 pages, R2-083005.

* cited by examiner

CIRCUIT SWITCHED FALLBACK HANDOVER METHOD AND APPARATUS, AND BASE STATION

CROSS-REFERENCE TO RELATED APPLICATIONS

This application is a continuation of International Application No. PCT/CN2012/087913, filed on Dec. 28, 2012, which is hereby incorporated by reference in its entirety.

TECHNICAL FIELD

The present invention relates to the field of communications technologies, and in particular, to a circuit switched fallback (CSFB) handover method and apparatus and a base station.

BACKGROUND

CSFB is a technology that uses another radio access network (RAN) in a coverage area of an Long Term Evolution (LTE) system to support a circuit switched (CS) Domain call. A CSFB process enables all CS services, such as a voice service, of user equipment, to be handed over to an access network with a relatively low bandwidth, for example, a Global System of Mobile Communications (GSM) or a Universal Mobile Telecommunications System (UMTS), thereby saving bandwidth resources of an operator.

In an existing CSFB handover method, a corresponding GSM/UMTS cell is generally preconfigured for each LTE cell. When user equipment (UE) needs to use a voice service, the UE is handed over to a GSM/UMTS cell corresponding to an LTE cell on which the UE is currently located. To reduce a voice service setup delay, the existing CSFB handover method generally uses blind handover. That is, when the UE needs to use the voice service, the UE is directly handed over to a preconfigured GSM/UMTS blind handover neighboring cell of the current LTE cell.

During the implementation of the present invention, the inventor finds that the prior art has at least the following problems:

The existing CSFB handover method is applicable to an overlapping coverage area between the LTE cell and the GSM/UMTS cell, but in a non-overlapping coverage area of the LTE cell and the GSM/UMTS cell, CSFB may fail, and consequently, the UE fails to be handed over and cannot use the CS service.

SUMMARY

To solve the problem in the prior art, embodiments of the present invention provides a CSFB handover method and apparatus, and a base station. Technical solutions are as follows:

According to one aspect, an embodiment of the present invention provides a CSFB handover method, where the method includes:

receiving, by an eNB (eNodeB, base station), a CSFB indication, where the CSFB indication indicates that a UE is handed over from an LTE cell to a 2G/3G cell to perform a CS service, and the LTE cell and the 2G/3G cell are built on a same site;

sending, by the eNB after receiving the CSFB indication, a measurement control message to the UE, where the measurement control message is used to instruct the UE to measure cell signal quality and send a corresponding event measurement report; and according to a receiving status of the event measurement report sent by the UE, selecting, by the eNB, to complete CSFB handover by using blind handover, or selecting to complete CSFB handover by using measurement-based handover.

Preferably, the sending a measurement control message to the UE includes:

sending a first measurement control message and a second measurement control message to the UE simultaneously, where the first measurement control message is used to instruct the UE to measure signal quality of a current LTE cell and send a first event measurement report, and the second measurement control message is used to instruct the UE to measure signal quality of the current LTE cell and a 2G/3G neighboring cell of the current LTE cell and send a second event measurement report; and accordingly, the according to a receiving status of the event measurement report sent by the UE, selecting, by the eNB, to complete CSFB handover by using blind handover, or selecting to complete CSFB handover by using measurement-based handover includes:

receiving the first event measurement report and the second event measurement report; if the first event measurement report is first received, selecting to complete the CSFB handover by using the blind handover; and if the second event measurement report is first received, selecting to complete the CSFB handover by using the measurement-based handover.

Further, the selecting to complete the CSFB handover by using the measurement-based handover includes:

selecting, from the second event measurement report, a 2G/3G cell with best signal quality to perform handover.

Optionally, the sending a measurement control message to the UE includes:

sending a first measurement control message to the UE, where the first measurement control message is used to instruct the UE to measure signal quality of a current LTE cell and send a first event measurement report; and accordingly, the according to a receiving status of the event measurement report sent by the UE, selecting, by the eNB, to complete CSFB handover by using blind handover, or selecting to complete CSFB handover by using measurement-based handover includes:

determining whether the first event measurement report is received within a predetermined time; if yes, selecting to complete the CSFB handover by using the blind handover; and if not, selecting to complete the CSFB handover by using the measurement-based handover.

Further, if the measurement-based handover is selected to complete the CSFB handover, the method further includes:

when the eNB does not receive the first event measurement report within the predetermined time, sending, by the eNB, a second measurement control message to the UE, where the second measurement control message is used to instruct the UE to measure signal quality of a current LTE cell and a 2G/3G neighboring cell of the current LTE cell and send a second event measurement report; and receiving the second event measurement report;

accordingly, the completing the CSFB handover by using the measurement-based handover includes:

selecting, from the second event measurement report, a 2G/3G cell with best signal quality to perform handover.

Specifically, the selecting to complete CSFB handover by using blind handover includes:

handing over the UE directly to a preconfigured blind handover neighboring cell of the current LTE cell.

According to another aspect, an embodiment of the present invention provides a CSFB handover apparatus, where the apparatus includes:

a first receiving module, configured to receive a CSFB indication, where the CSFB indication indicates that a UE is handed over from an, LTE cell to a 2G/3G cell to perform a CS service, and the LTE cell and the 2G/3G cell are built on a same site;

a sending module, configured to: after the first receiving module receives the CSFB indication, send a measurement control message to the UE, where the measurement control message is used to instruct the UE to measure cell signal quality and send a corresponding event measurement report;

a second receiving module, configured to receive an event measurement report sent by the UE; and a handover module, configured to, according to a receiving status of the event measurement report sent by the UE, select to complete CSFB handover by using blind handover, or select to complete CSFB handover by using measurement-based handover.

Preferably, the sending module is configured to send a first measurement control message and a second measurement control message to the UE simultaneously, where the first measurement control message is used to instruct the UE to measure signal quality of a current LTE cell and send a first event measurement report, and the second measurement control message is used to instruct the UE to measure signal quality of the current LTE cell and a 2G/3G neighboring cell of the current LTE cell and send a second event measurement report; and accordingly, the handover module includes:

a first handover unit, configured to: when the second receiving module receives the first event measurement report first, complete the CSFB handover by using the blind handover; and a second handover unit, configured to: when the second receiving module receives the second event measurement report first, complete the CSFB handover by using the measurement-based handover.

Further, the first handover unit is configured to: when the second receiving module receives the first event measurement report first, hand over the UE directly to a preconfigured blind handover neighboring cell of the current LTE cell.

Further, the second handover unit is configured to: when the second receiving module receives the second event measurement report first, select, from the second event measurement report, a 2G/3G cell with best signal quality to perform handover.

Optionally, the sending module is configured to send a first measurement control message to the UE, where the first measurement control message is used to instruct the UE to measure signal quality of a current LTE cell and send a first event measurement report; and accordingly, the handover module includes:

a determining unit, configured to determine whether the second receiving module receives the first event measurement report within a predetermined time;

a third handover unit, configured to: when a determining result of the determining unit is yes, select to complete the CSFB handover by using the blind handover; and a fourth handover unit, configured to: when the determining result of the determining unit is no, select to complete the CSFB handover by using the measurement-based handover.

Specifically, the third handover unit is configured to hand over the UE directly to a preconfigured blind handover neighboring cell of the current LTE cell.

Further, the sending module is further configured to: when the determining result of the determining unit is no, send a second measurement control message to the UE, where the second measurement control message is used to instruct the UE to measure signal quality of the current LTE cell and a 2G/3G neighboring cell of the current LTE cell and send a second event measurement report; and accordingly, the fourth handover unit is configured to select, from the second event measurement report, a 2G/3G cell with best signal quality to perform handover.

According to still another aspect, an embodiment of the present invention further provides a base station, where the base station includes:

a receiver, configured to receive a CSFB indication and an event measurement report sent by a UE, where the CSFB indication indicates that user equipment is handed over from an LTE cell to a 2G/3G cell to perform a circuit switched CS service, and a site of a base station serving the LTE cell is the same as a site of a base station serving the 2G/3G cell;

a sender, configured to send a measurement control message; and a processor, configured to: when the receiver receives the CSFB indication, control the sender to send the measurement control message to the UE, and according to a status of receiving, by the receiver, the event measurement report sent by the UE, select to complete CSFB handover by using blind handover, or select to complete CSFB handover by using measurement-based handover, where the measurement control message is used to instruct the UE to measure cell signal quality and send a corresponding event measurement report.

Preferably, the processor is configured to:

control the sender to simultaneously send a first measurement control message and a second measurement control message to the user equipment, where the first measurement control message is used to instruct the user equipment to measure signal quality of a current LTE cell and send a first event measurement report, and the second measurement control message is used to instruct the user equipment to measure signal quality of the current LTE cell and a 2G/3G neighboring cell of the current LTE cell and send a second event measurement report; and if the first event measurement report is first received, select to complete the CSFB handover by using the blind handover; and if the second event measurement report is first received, select to complete the CSFB handover by using the measurement-based handover.

Preferably, the processor is configured to:

control the sender to send a first measurement control message to the user equipment, where the first measurement control message is used to instruct the user equipment to measure signal quality of a current LTE cell and send a first event measurement report; and determine whether the first event measurement report is received within a predetermined time; if yes, select to complete the CSFB handover by using the blind handover; and if not, select to complete the CSFB handover by using the measurement-based handover.

The technical solutions provided by the embodiments of the present invention bring the following beneficial effects:

In the embodiments of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

To make the present invention more comprehensible, an application scenario of the embodiments of the present invention is briefly described first. The embodiments of the present invention are applicable to a scenario in which an LTE cell and a 2G/3G cell are built on a same site.

Specifically, that an LTE cell and a 2G/3G cell are built on a same site may include at least the following cases: 1. An LTE cell, a GSM cell, and a UMTS cell are built on a same site; 2. An LTE cell and a GSM cell are built on a same site; 3. An LTE cell and a UMTS cell are built on a same site; and 4. An LTE cell and a CDMA 2000 (Code Division Multiple Access 2000, Code Division Multiple Access 2000) cell are built on a same site.

The following describes in detail, by using the foregoing third case as an example, the application scenario of the embodiments of the present invention.

An operator implements, by using a UMTS 2100, continuous coverage in an urban area, with a very dense coverage in a traffic hotspot area. During the early building of LTE, the operator covers the traffic hotspot area by using an LTE 2600 or an LTE 1800. An LTE cell and a UMTS cell may be built on a same site, or a site of a base station serving the LTE cell is the same as a site of a base station serving the 2G/3G cell.

Figure 1:
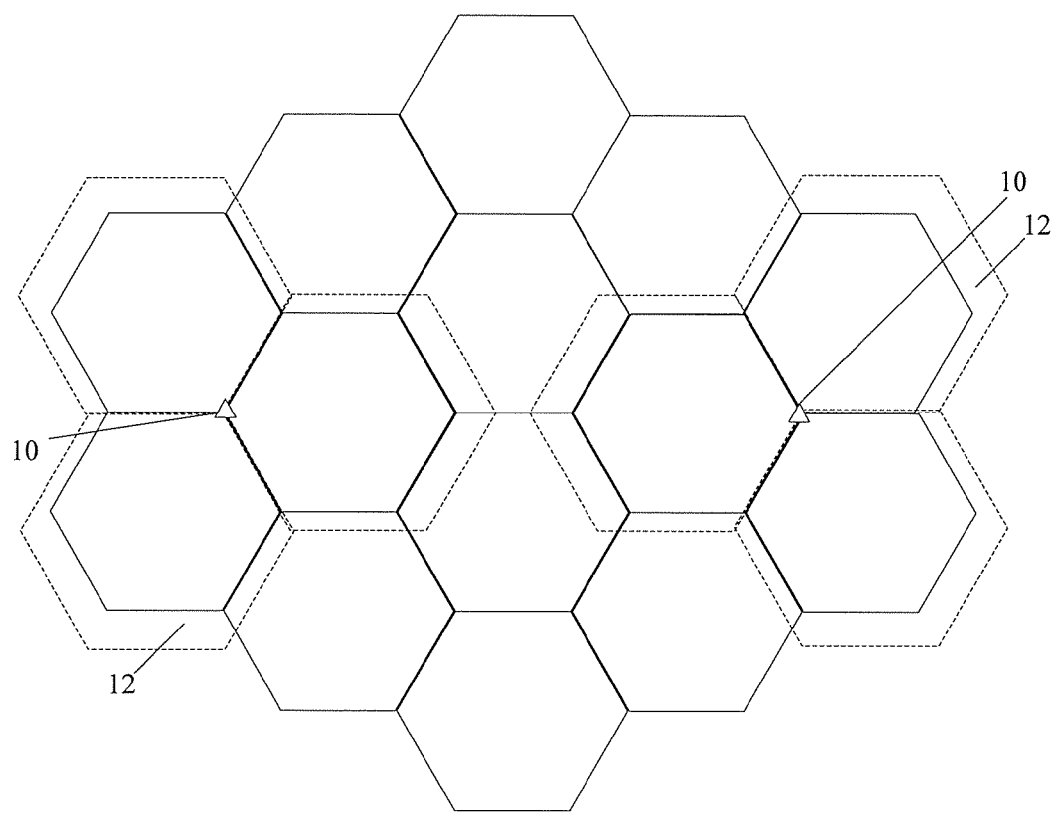
FIG. 1 is a schematic diagram of an application scenario of embodiments of the present invention.

A ratio of a size of the LTE cell to a size of the UMTS cell is not strictly 1:1, and LTE cells may not be consecutive. As shown in FIG. 1, a dashed box represents an LTE cell, and a solid box represents a UMTS cell. It can be seen from the figure that coverage of a UMTS cell is greater than coverage of an LTE cell that is built on the same site as the UMTS cell. When a UE is located in a non-overlapping area 12 (that is, an area in a dashed box and is far away from a base station 10) of a dashed box and a solid box in FIG. 1, if the UE needs to use a CS service, the UE is directly handed over, by using the prior art, to a preconfigured blind handover neighboring cell, which causes a handover failure, and consequently, the UE cannot use the CS service. In view of this, the embodiments of the present invention provide a solution of selecting a handover manner according to signal quality of an LTE cell in which the UE is currently located, so as to solve the foregoing problem and increase a CSFB handover success rate. The following describes in detail the present invention by using specific embodiments.

Embodiment 1

Figure 2:
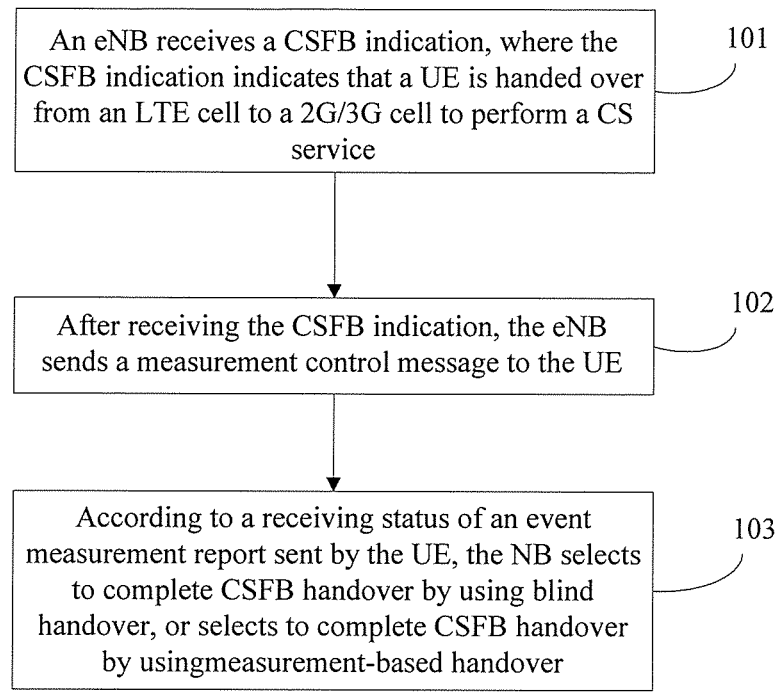
FIG. 2 is a flowchart of a CSFB handover method according to Embodiment 1 of the present invention.

An embodiment of the present invention provides a CSFB handover method. As shown in FIG. 2, the method includes:

Step 101: An eNB receives a CSFB indication, where the CSFB indication indicates that a UE is handed over from an LTE cell to a 2G/3G cell to perform a CS service, and a site of a base station serving the LTE cell is the same as a site of a base station serving the 2G/3G cell, or the LTE cell and the 2G/3G cell are built on a same site.

It is easily learned that in this embodiment of the present invention, that a site of a base station serving the LTE cell is the same as a site of a base station serving the 2G/3G cell means that a base station serving the LTE cell and a base station serving the 2G/3G cell are in a same location, for example, it maybe that a same base station serves the LTE cell and the 2G/3G cell, where the base station may be a dual-mode base station/multi-mode base station. In addition, in each embodiment of the present invention, the so-called "2G/3G cell" refers to a "2G cell" and/or a "3G cell."

Specifically, the CSFB indication may be sent by an MME (Mobility Management Entity, mobility management entity) to the eNB.

Step 102: After receiving the CSFB indication, the eNB sends a measurement control message to the UE, where the measurement control message is used to instruct the UE to measure cell signal quality and send a corresponding event measurement report.

Step 103: According to a receiving status of the event measurement report sent by the UE, the eNB selects to complete CSFB handover by using blind handover, or to complete CSFB handover by using measurement-based handover.

Specifically, completing the CSFB handover by using the blind handover includes: handing over the UE directly to a preconfigured blind handover neighboring cell of a current LTE cell. The blind handover neighboring cell is a 2G/3G cell, which includes but is not limited to a GSM or UMTS or CDMA 2000 cell.

Specifically, the measurement-based handover refers to that signal quality of a 2G/3G neighboring cell of the current LTE cell is measured first, and then handover is initiated according to the measured signal quality of the 2G/3G neighboring cell. The 2G/3G neighboring cell includes but is not limited to a GSM or UMTS or CDMA 2000 neighboring cell.

The measurement on the signal quality of the 2G/3G neighboring cell of the current LTE cell is performed according to an actual network building status. When the LTE cell and a network cell is built on a same site, the UE is instructed to measure signal quality of the network cell, so as to hand over the UE to a 2G/3G cell built on the same site as the LTE cell to perform a CS service.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability.

Embodiment 2

Figure 3:
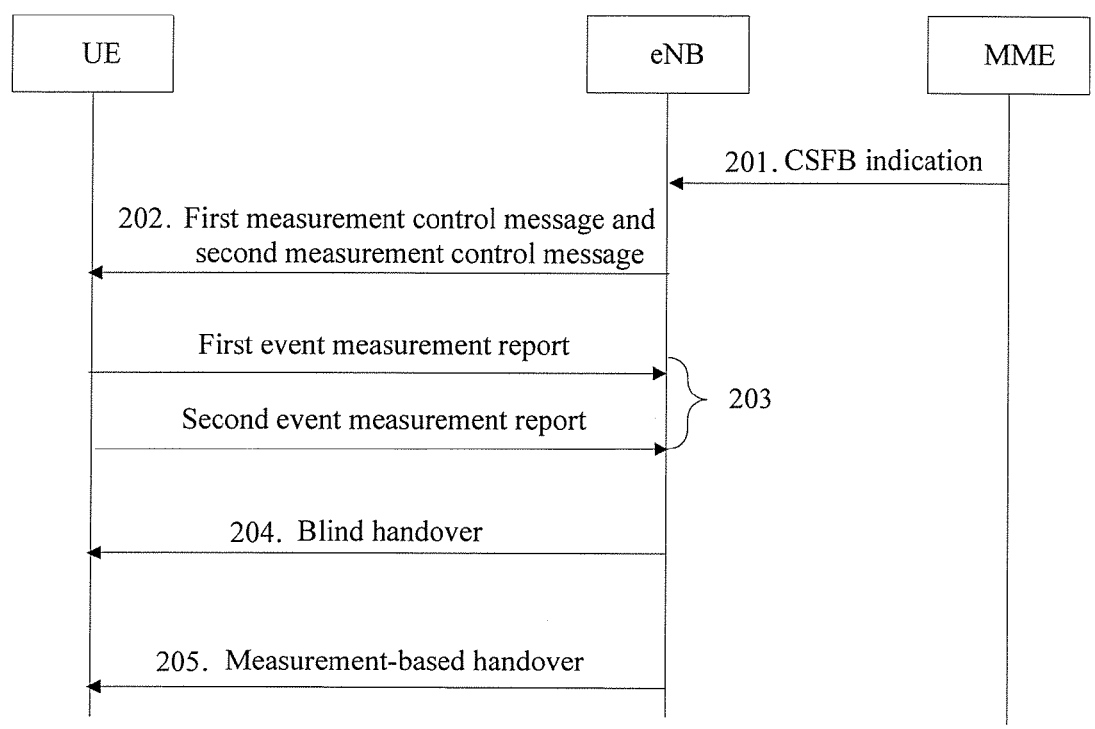
FIG. 3 is a flowchart of a CSFB handover method according to Embodiment 2 of the present invention.

An embodiment of the present invention describes a CSFB handover method according to this embodiment of the present invention, by taking an example that an LTE cell and a UMTS cell are built on a same site and a UE is handed over from an LTE system to a UMTS network to perform a CS service. As shown in FIG. 3, the method includes:

Step 201: An eNB receives a CSFB indication from an MME.

The CSFB indication indicates that a UE is handed over from an LTE cell to a 2G/3G cell to perform a CS service.

Step 202: The eNB simultaneously sends a first measurement control message and a second measurement control message to the UE, where the first measurement control message is used to instruct the UE to measure signal quality of a current LTE cell and send a first event measurement report, and the second measurement control message is used to instruct the UE to measure signal quality of the current LTE cell and a UMTS neighboring cell of the current LTE cell and send a second event measurement report.

Specifically, when receiving the first measurement control message (in an actual application, the first measurement control message may be referred to as an A1 measurement control message), the UE measures signal quality of an LTE cell in which the UE is currently located, compares the measured signal quality of the LTE cell with a threshold in the A1 measurement control message, and if the measured signal quality of the LTE cell is greater than the threshold in the A1 measurement control message, sends the first event measurement report (in an actual application, the first event measurement report may be referred to as an A1 event measurement report) to the eNB, where the first event measurement report includes the signal quality of the LTE cell in which the UE is currently located.

When receiving the second measurement control message (in an actual application, the second measurement control message may be referred to as a B1 measurement control message), the UE measures signal quality of the LTE cell in which the UE is currently located and signal quality of a 2G/3G neighboring cell of the LTE cell in which the UE is currently located, compares the measured signal quality of the 2G/3G neighboring cell with a threshold in the B1 measurement control message, and if the measured signal quality of the 2G/3G neighboring cell is greater than the threshold in the B1 measurement control message, sends a second event measurement report (in an actual application, the second event measurement report may be referred to as an B1 event measurement report) to the eNB, where the second event measurement report includes the signal quality of the LTE cell in which the UE is currently located and the signal quality of the 2G/3G neighboring cell of the LTE cell.

Step 203: If the first event measurement report is first received, perform step 204; and if the second event measurement report is first received, perform step 205.

In this step, the eNB receives an event measurement report. In the case that the LTE cell and the UMTS cell are built on the same site, if the first event measurement report is first received, it indicates, to a certain degree, that the signal quality of the LTE cell is good; and if the second event measurement report is first received, it indicates, to a certain degree, that the signal quality of the LTE cell is not good. Because a current serving cell of the UE is the LTE cell, in the case that the signal quality of the LTE cell is good, the first event measurement report is received faster than the second event measurement report. Therefore, if the second event measurement report corresponding to the 2G/3G cell is first received, it indicates that the signal quality of the LTE cell is not good.

In addition, if the signal quality of the LTE cell is good, it indicates that the UE is closer to the eNB. Because the LTE cell and the UMTS cell are built on the same site, it can be seen from FIG. 1 that in a position closer to the eNB, there is overlapping coverage of the LTE cell and the UMTS cell, in this case, blind handover may be performed directly (step 204). If the signal quality of the LTE cell is not good, it indicates that the UE is far away from the eNB. It can be seen from FIG. 1 that in this case, the UE may be located in coverage of the LTE cell but is in an area (that is, an area indicated by 12 in FIG. 1) beyond coverage of the UMTS cell that is built on the same site as the LTE cell. If blind handover is used in this case, a handover failure may occur. Therefore, in this case, measurement-based handover is used (step 205), and a target handover cell (the target handover cell maybe a 2G/3G cell that does not share a site with the current LTE cell) is selected according to the second event measurement report, so as to ensure CSFB handover success.

Step 204: Complete CSFB handover by using blind handover.

Specifically, step 204 includes: handing over the UE directly to a preconfigured UMTS blind handover neighboring cell of the LTE cell in which the UE is currently located.

During a specific implementation, step 204 includes:

sending, by the eNB, a handover instruction to the UE, where the handover instruction includes a UMTS blind handover neighboring cell of the current LTE cell.

Step 205: Complete CSFB handover by using measurement-based handover.

Specifically, step 205 includes:

selecting, from the second event measurement report, a UMTS cell with best signal quality to perform handover.

More specifically, step 205 includes:

sending, by the eNB, a handover instruction to the UE, where the handover instruction includes a target UMTS cell, that is, a cell with best signal quality in the foregoing second event measurement report.

By performing the foregoing steps 203 to 205, the eNB, according to a receiving status of the event measurement report sent by the UE, selects to complete the CSFB handover by using the blind handover, or selects to complete the CSFB handover by using the measurement-based handover.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability. In addition, in this embodiment of the present invention, a first measurement control message and a second measurement control message are simultaneously sent and a handover manner is selected according to a sequence of receiving a first event measurement report and a second measurement report, which ensures that blind handover is used as much as possible, and time for measuring signal quality of a 2G/3G cell may be saved when the blind handover is used, thereby shortening a voice service setup delay.

Embodiment 3

Figure 4:
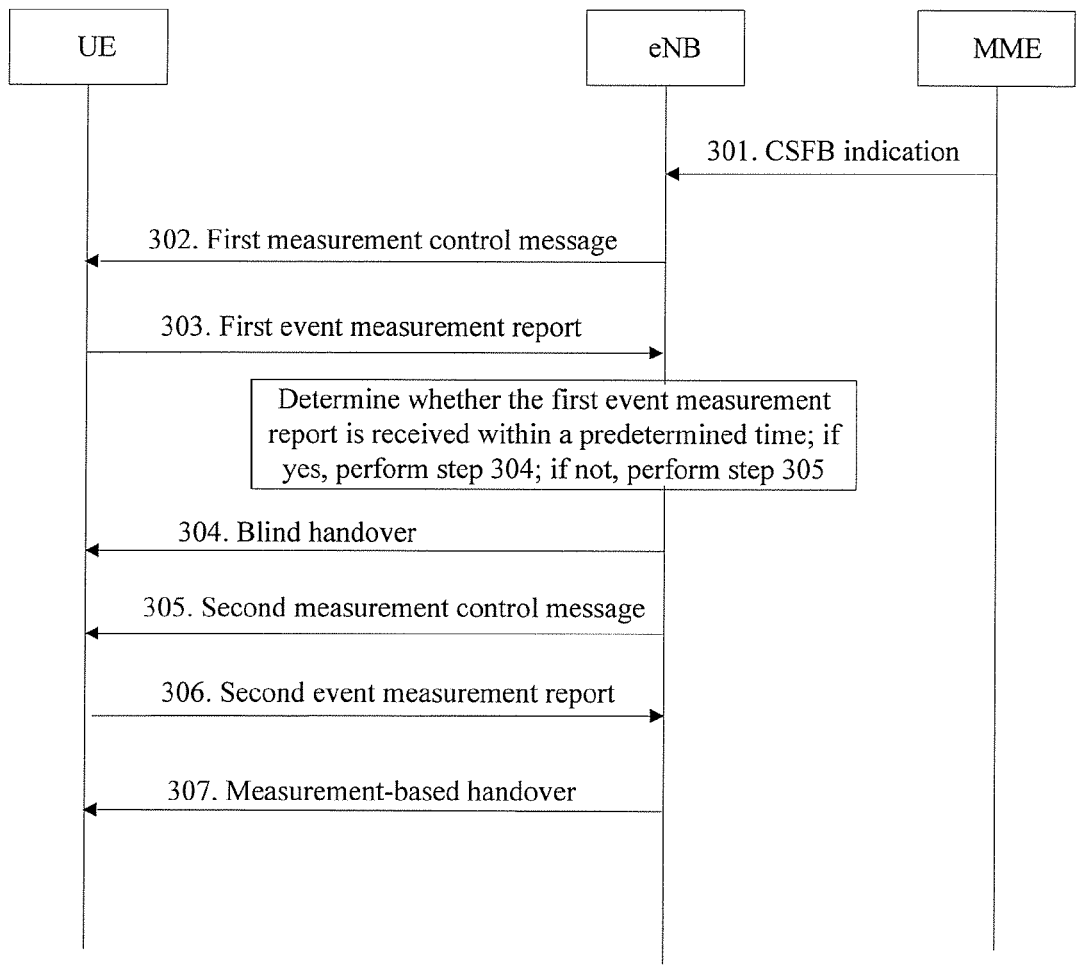
FIG. 4 is a flowchart of a CSFB handover method according to Embodiment 3 of the present invention.

An embodiment of the present invention describes a CSFB handover method according to this embodiment of the present invention, also by taking an example that an LTE cell and a UMTS cell are built on a same site and a UE is handed over from an LTE system to a UMTS network to perform a CS service. As shown in FIG. 4, the method includes:

Step 301: An eNB receives a CSFB indication from an MME.

The CSFB indication indicates that a UE is handed over from an LTE cell to a 2G/3G cell to perform a CS service.

Step 302: Send a first measurement control message to the UE, where the first measurement control message is used to instruct the UE to measure signal quality of a current LTE cell and send a first event measurement report.

Step 303: Determine whether the first event measurement report sent by the UE is received within a predetermined time; if yes, perform step 304; and if not, perform step 305.

Step 304: Complete CSFB handover by using blind handover.

Specifically, completing the CSFB handover by using the blind handover includes: handing over the UE directly to a preconfigured UMTS blind handover neighboring cell of the current LTE cell.

Step 305: Send a second measurement control message to the UE, where the second measurement control message is used to instruct the UE to measure signal quality of the current LTE cell and the UMTS neighboring cell of the current LTE cell and send a second event measurement report.

Step 306: Receive the second event measurement report sent by the UE.

Step 307: Complete CSFB handover by using measurement-based handover.

Specifically, step 307 includes: selecting, from the second event measurement report, a UMTS cell with best signal quality to perform handover.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability.

Embodiment 4

Figure 5:
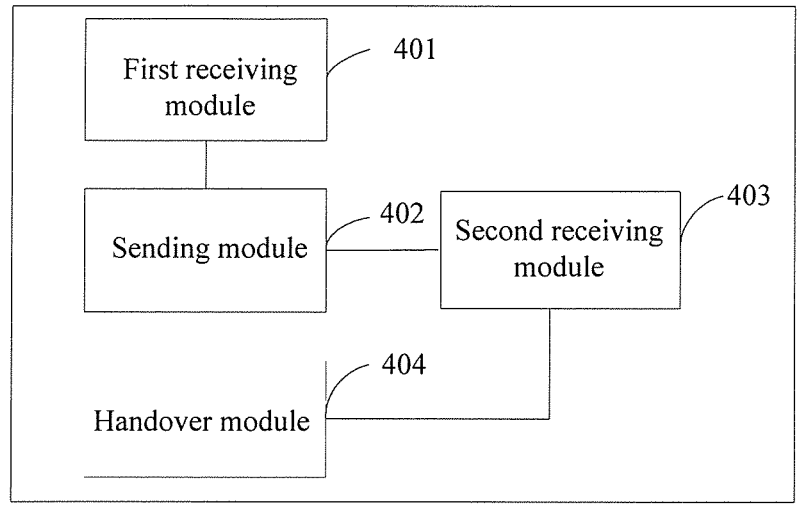
FIG. 5 is a schematic structural diagram of a CSFB handover apparatus according to Embodiment 4 of the present invention.

Embodiment 4 of the present invention provides a CSFB handover apparatus, and is applicable to the method provided by Embodiment 1. As shown in FIG. 5, the apparatus includes:

a first receiving module 401, configured to receive a CSFB indication, where the CSFB indication indicates that a UE is handed over from an LTE cell to a 2G/3G cell to perform a CS service, and the LTE cell and the 2G/3G cell are built on a same site;

a sending module 402, configured to: after the receiving module 401 receives the CSFB indication, send a measurement control message to the UE, where the measurement control message is used to instruct the UE to measure cell signal quality and send a corresponding event measurement report;

a second receiving module 403, configured to receive an event measurement report sent by the UE; and a handover module 404, configured to, according to a receiving status of the event measurement report sent by the UE, select to complete CSFB handover by using blind handover, or select to complete CSFB handover by using measurement-based handover.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability.

Embodiment 5

Figure 6A:
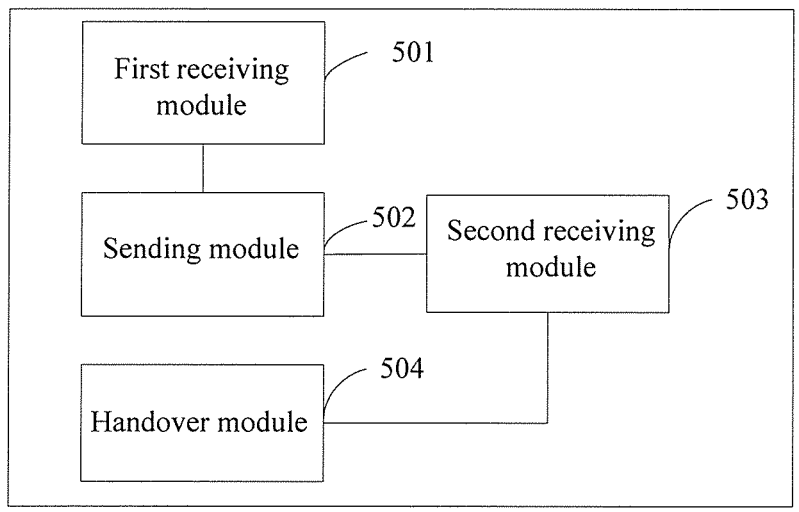
FIG. 6a is a schematic structural diagram of a CSFB handover apparatus according to Embodiment 5 of the present invention.

Embodiment 5 of the present invention provides a CSFB handover apparatus, and is applicable to the method provided by Embodiment 2. As shown in FIG. 6a, the apparatus includes:

a first receiving module 501, configured to receive a CSFB indication, where the CSFB indication indicates that a UE is handed over from an LTE cell to a 2G/3G cell to perform a CS service, and the LTE cell and the 2G/3G cell are built on a same site;

a sending module 502, configured to: after the receiving module 501 receives the CSFB indication, send a measurement control message to the UE, where the measurement control message is used to instruct the UE to measure cell signal quality and send a corresponding event measurement report; and a second receiving module 503, configured to receive an event measurement report sent by the UE; and a handover module 504, configured to, according to a receiving status of the event measurement report sent by the UE, select to complete CSFB handover by using blind handover, or select to complete CSFB handover by using measurement-based handover.

Further, the sending module 502 is configured to simultaneously send a first measurement control message and a second measurement control message to the UE, where the first measurement control message is used to instruct the UE to measure signal quality of a current LTE cell and send a first event measurement report, and the second measurement control message is used to instruct the UE to measure signal quality of the current LTE cell and a 2G/3G neighboring cell of the current LTE cell and send a second event measurement report.

Figure 6B:
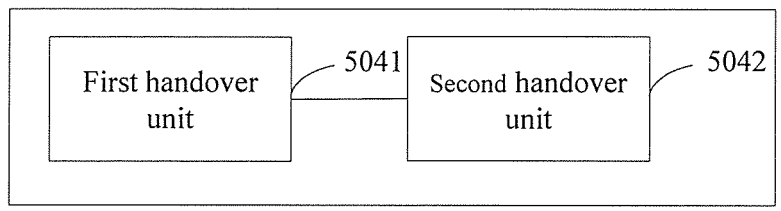
FIG. 6b is a schematic structural diagram of a determining module according to Embodiment 5 of the present invention.

Accordingly, as shown in FIG. 6b, the handover module 504 includes:

a first handover unit 5041, configured to: when the second receiving module 503 first receives the first event measurement report, select to complete the CSFB handover by using the blind handover;

a second handover unit 5042, configured to: when the second receiving module 503 first receives the second event measurement report, select to complete the CSFB handover by using the measurement-based handover.

Specifically, the first handover unit 5041 is configured to: when the second receiving module 503 receives first the first event measurement report, hand over the UE directly to a preconfigured 2G/3G cell that corresponds to the current LTE cell.

Specifically, the second handover unit 5042 is configured to: when the second receiving module 503 first receives the second event measurement report, select, from the second event measurement report, a 2G/3G cell with best signal quality to perform handover.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability. In addition, in this embodiment of the present invention, a first measurement control message and a second measurement control message are sent simultaneously and a handover manner is selected according to a sequence of receiving a first event measurement report and a second measurement report, which ensures that blind handover is used as much as possible, and time for measuring signal quality of a 2G/3G cell may be saved when the blind handover is used, thereby shortening a voice service setup delay.

Embodiment 6

Figure 7A:
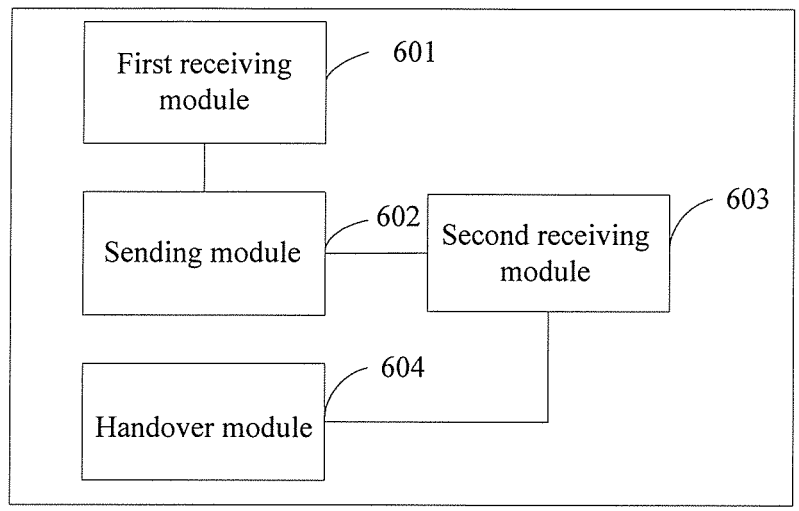
FIG. 7a is a schematic structural diagram of a CSFB handover apparatus according to Embodiment 6 of the present invention.
Figure 7B:
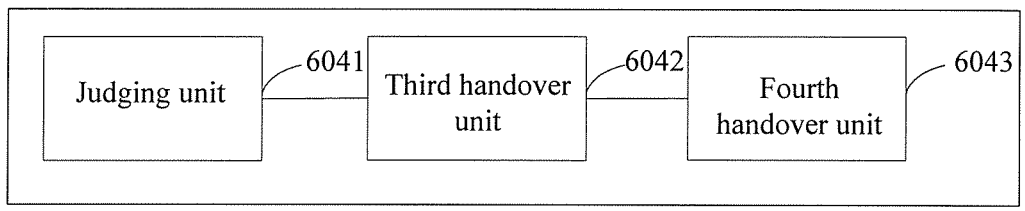
FIG. 7b is a schematic structural diagram of a determining module according to Embodiment 6 of the present invention.

Embodiment 6 of the present invention provides a CSFB handover apparatus, and is applicable to the method provided by Embodiment 3. As shown in FIG. 7a, the apparatus includes:

a receiving module 601, configured to receive a CSFB indication, where the CSFB indication indicates that a UE is handed over from an LTE cell to a 2G/3G cell to perform a CS service, and the LTE cell and the 2G/3G cell are built on a same site;

a sending module 602, configured to: after the receiving module 601 receives the CSFB indication, send a measurement control message to the UE, where the measurement control message is used to instruct the UE to measure cell signal quality and send a corresponding event measurement report;

a second receiving module 603, configured to receive an event measurement report sent by the UE; and a handover module 604, configured to, according to a receiving status of the event measurement report sent by the UE, select to complete CSFB handover by using blind handover, or select to complete CSFB handover by using measurement-based handover.

Specifically, the sending module 602 is configured to:

send a first measurement control message to the UE, where the first measurement control message is used to instruct the UE to measure signal quality of a current LTE cell and send a first event measurement report.

Accordingly, the handover module 604 includes:

a determining unit 6041, configured to determine whether the second receiving module 603 receives the first event measurement report within a predetermined time;

a third handover unit 6042, configured to: when a determining result of the determining unit 6041 is yes, select to complete the CSFB handover by using the blind handover; and a fourth handover unit 6043, configured to: when the determining result of the determining unit 6041 is no, select to complete the CSFB handover by using the measurement-based handover.

Further, the third handover unit 6042 is configured to hand over the UE directly to a preconfigured blind handover neighboring cell of the current LTE cell.

Further, the sending module 602 is further configured to: when the determining result of the determining unit 6041 is no, send a second measurement control message to the UE, where the second measurement control message is used to instruct the UE to measure signal quality of the current LTE cell and a 2G/3G neighboring cell of the current LTE cell and send a second event measurement report.

Accordingly, the fourth handover unit 6043 is configured to select, from the second event measurement report, a 2G/3G cell with best signal quality to perform handover.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability.

It should be noted that the CSFB handover apparatuses according to Embodiment 4, Embodiment 5, and Embodiment 6 of the present invention may be base stations (for example, eNB).

Embodiment 7

Figure 8:
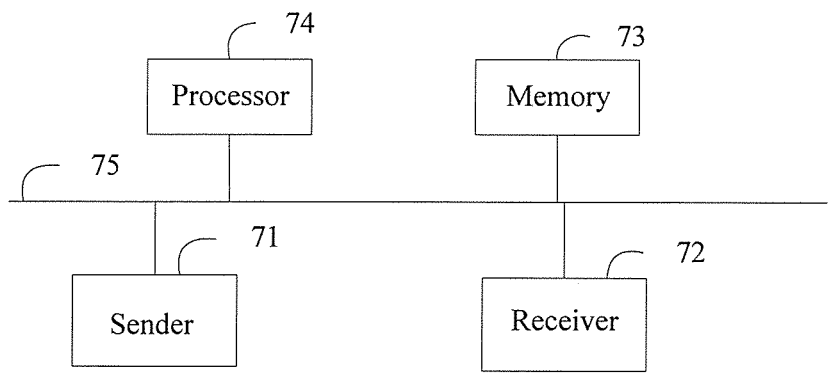
FIG. 8 is a schematic structural diagram of a base station according to Embodiment 7 of the present invention.

This embodiment of the present invention provides a base station. As shown in FIG. 8, the base station includes a sender 71, a receiver 72, and at least one processor 74 (for example, a CPU).

The following specifically describes each component of a base station 70 with reference to FIG. 8:

The receiver 72 is configured to receive a CSFB indication, and receive a first event measurement report and a second event measurement report sent by a UE; and the sender 71 is configured to send, under the control of the processor 74, a first measurement control message, a second measurement control message, and a handover instruction to the UE.

Specifically, by running or executing a software program and/or an application module stored in a memory and invoking data stored in the memory, the processor 74 may implement the following: When receiving a CSFB indication, the receiver 72 controls the sender 71 to send a measurement control message, where the measurement control message is used to instruct the UE to measure cell signal quality and send a corresponding event measurement report, and according to a status of receiving, by the receiver 72, the event measurement report sent by the UE, select to complete CSFB handover by using blind handover, or select to complete CSFB handover by using measurement-based handover.

Preferably, that the processor 74 controls the sender 71 to send a measurement control message to the UE includes that:

the processor 74 controls the sender 71 to simultaneously send the first measurement control message and the second measurement control message to the UE, where the first measurement control message is used to instruct the UE to measure signal quality of a current LTE cell and send a first event measurement report, and the second measurement control message is used to instruct the UE to measure signal quality of the current LTE cell and a UMTS neighboring cell of the current LTE cell and send the second event measurement report; and the processor 74 receives, by using the receiver 72, the first event measurement report and/or the second event measurement report; if first receiving the first event measurement report, initiates blind handover (that is, selecting to complete the CSFB handover by using the blind handover) by using the sender 71; and if first receiving the second event measurement report, initiates measurement-based handover (that is, selecting to complete the CSFB handover by using the measurement-based handover) by using the sender 71.

Optionally, that the processor 74 controls the sender 71 to send a measurement control message to the UE includes that:

the processor 74 controls the sender 71 to send the first measurement control message; receives, by using the receiver 72, the first event measurement report sent by the UE; determines whether the receiver 72 receives, within a predetermined time, the first event measurement report sent by the UE; if the first event measurement report sent by the UE is received within the predetermined time, initiates the blind handover by using the sender 71; and if the first event measurement report sent by the UE is not received within the predetermined time, initiates the measurement-based handover by using the sender 71.

Further, if the measurement-based handover is selected, the processor 74 controls the sender 71 to send the second measurement control message to the UE, where the second measurement control message is used to instruct the UE to measure signal quality of the current LTE cell and a 2G/3G neighboring cell of the current LTE cell and send a second event measurement report, and receives, by using the receiver 72, the second event measurement report. Then, the processor 74 selects, from the second event measurement report, a 2G/3G cell with best signal quality, and initiates the measurement-based handover by using the sender 71.

It is easily learned that the base station 70 may further include parts such as a memory 73 and a communications bus 75.

The memory 73 may be configured to store a software program and an application module, and the processor 74 runs the software program and/or the application module stored in the memory 73, so as to perform various functional applications and data processing of the base station 70. The memory 73 may mainly include a program storage area and a data storage area, where the program storage area may store an operating system, at least one application program required by a function, and the like; and the data storage area may store data created, and the like, according to a use of the base station 70. In addition, the memory 73 may include a high-speed RAM (Random Access Memory, random access memory), and may further include a non-volatile memory (non-volatile memory), for example, at least one magnetic disk storage device, a flash memory device, or another volatile solid-state storage device.

The communications bus 75 is configured to implement connection communication between the processor 74, the memory 73, the sender 71, and the receiver 72.

A person of ordinary skill in the art may understand that the structure shown in FIG. 8 does not constitute a limitation on the base station, and the base station may include more or fewer parts than those shown in FIG. 8 or a combination of some parts, or parts that are laid out is a manner different from that shown in FIG. 8.

In this embodiment of the present invention, after receiving a CSFB indication, an eNB sends a measurement control message to a UE, and selects a handover manner according to an event measurement report sent by the UE, so as to hand over the UE to a 2G/3G neighboring cell of an LTE cell. This can prevent, in the prior art, a phenomenon of a CSFB failure caused by blind handover when a UE is located in an LTE cell beyond coverage of a 2G/3G cell, thereby increasing a handover success probability.

It should be noted that when the CSFB handover apparatus provided by the foregoing embodiment performs CSFB handover, the division of the foregoing functional modules is used as an example only. During an actual application, the foregoing functions can be assigned to and implemented by different functional modules according to a requirement, that is, the internal structure of the apparatus is divided into different functional modules to perform all or some of the foregoing functions. In addition, the CSFB handover apparatus provided by the foregoing embodiment and the embodiments of the CSFB handover method are based on a same idea. For the specific implementation process of the CSFB handover apparatus, refer to the method embodiments, which is not further described herein.

The sequence numbers of the foregoing embodiments of the present invention are for ease of description only, and do not represent superiority or inferiority of the embodiments.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A circuit switched fallback (CSFB) handover method, comprising;

receiving, by a base station, CSFB indication indicating that user equipment is handed over from an Long Term Evolution (LTE) cell to a 2G/3G cell to perform a circuit switched (CS) service, wherein a site of a base station serving the LTE cell is the same as a site of a base station serving the 2G/3G cell;

sending, by the base station after receiving the CSFB indication, a measurement control message to the user equipment, wherein the measurement control message is used to instruct the user equipment to measure cell signal quality and send a corresponding event measurement report; and according to a receiving status of the event measurement report sent by the user equipment, selecting, by the base station, to complete CSFB handover by using blind handover, or to complete CSFB handover by using measurement-based handover; wherein:

sending the measurement control message to the user equipment comprises:
  sending a first measurement control message and a second measurement control message to the user equipment simultaneously, wherein the first measurement control message is used to instruct the user equipment to measure signal quality of a current LTE cell and send a first event measurement report, and the second measurement control message is used to instruct the user equipment to measure signal quality of the current LTE cell and a 2G/3G neighboring cell of the current LTE cell and send a second event measurement report; and selecting, by the base station, to complete CSFB handover by using blind handover, or to complete CSFB handover by using measurement-based handover comprises:
  if the first event measurement report is first received selecting to complete CSFB handover by using the blind handover, and
  if the second event measurement report is first received, selecting to complete the CSFB handover by using the measurement-based handover.

2. The method according to claim 1, wherein selecting to complete the CSFB handover by using the measurement-based handover comprises:
  selecting, from the second event measurement report, a 2G/3G cell with best signal quality to perform handover.

3. The method according to claim 1, wherein selecting to complete CSFB handover by using blind handover comprises:
  handing over the user equipment directly to a preconfigured blind handover neighboring cell of the current LIE cell.

4. A circuit switched fallback (CSFB) handover method, comprising:
  receiving, by a base station, a CSFB indication indicating that user equipment is handed over from an Long Term Evolution (LTE)cell to a 2G/3G cell to perform a circuit switched (CS) service, wherein a site of a base station serving the LIE cell is the same as a site of a base station serving the 2G/3G cell;
  sending, by the base station after, receiving the CFSB indication, a measurement control message to the user equipment, wherein the measurement control message is used to instruct the user equipment to measure cell signal quality and send a corresponding event measurement report; and
  according to a receiving status of the event measurement report sent by the user equipment, selecting, by the base station, complete CSFB handover by using blind handover, or to complete CSFB handover by using measurement-based handover; wherein;

sending the measurement control message to the user equipment comprises:
  sending a first measurement control message to the user equipment, wherein the first measurement control message is used to instruct the user equipment to measure signal quality of a current LTE cell and send a first event measurement report; and selecting, by the base station, to complete CFSB handover by using blind handover, or to complete CFSB handover by using measurement-based handover comprises:
  determining whether the first event measurement report is received within a predetermined time,
  if the first event measurement report is received within the predetermined time, selecting to complete the CSFB handover by using the blind handover, and
  if the first event measurement report is not received within the predetermined time, selecting to complete the CSFB handover by using the measurement-based handover.

5. The method according to claim 4, wherein:
  if the measurement-based handover is selected to complete the CSFB handover, the method further comprises;
    when the base station does not receive the first event measurement report within the predetermined time, sending, by the base station, a second measurement control message to the user equipment, wherein the second measurement control message is used to instruct the user equipment to measure signal quality of the current LTE cell and a 2G/3G neighboring cell of the current LTE cell and send a second event, measurement report, and receiving the second event measurement report; and
  selecting to complete the CSFB handover by using the measurement-based handover comprises:
    selecting, from the second event measurement report a 2G/3G cell with best signal quality to perform handover.

6. A circuit switched, fallback (CFSB) apparatus, comprising:
  a first receiving module, configured to receive a CSFB indication indicating that user equipment is handed over from an Long Term Evolution (LTE) cell to a 2G/3G cell to perform a circuit switched (CS) service, and wherein a site of a base station serving the LTE cell is the same as a site of a base station serving the 2G/3G cell;
  a sending module, configured to: after the first receiving module receives the CSFB indication, send a measurement control message to the user equipment, wherein the measurement control message is used to instruct the user equipment to measure cell signal quality and send a corresponding event measurement report;
  a second receiving module, configured to receive the event measurement report sent by the user equipment; and
  a handover module, configured to, according to a receiving status of the event measurement report sent by the user equipment, select to complete CSFB handover by using blind handover, or select to complete CSFB handover by using measurement-based handover; wherein:
  the sending module is configured to send a first measurement control message and a second measurement control message to the user equipment simultaneously, wherein the first measurement control message is used to instruct the user equipment to measure signal quality of a current LTE cell and send a first event measurement report, and the second measurement control message is used to instruct the user equipment to measure signal quality of the LTE cell and 2G/3G neighboring cell of the current LTE cell and a send a second event measurement report; and the handover module comprises:
- a first handover unit, configured to: when the second receiving module receives the first event measurement report first, complete the CSFB handover by using the blind handover, and
- a second handover unit, configured to: when the second receiving module receives the second event measurement report first, complete the CSFB handover by using the measurement-based handover.

7. The apparatus according to claim 6, wherein the first handover unit is configured to: when the second receiving module receives the first event measurement report first, hand over the user equipment directly to a preconfigured blind handover neighboring cell of the current LTE cell.

8. The apparatus according to claim 6, wherein the second handover unit is configured to: when the second receiving module receives the second event measurement report first, select, from the second event measurement report, a 2G/3G cell with best signal quality to perform handover.

9. A circuit switched fallback CSFB apparatus, comprising:
- a first receiving module, configured to receive CSFB indication indicating that user equipment is handed over from an Long Term Evolution (LTE) cell to a 2G/3G cell to perform a circuit switched (CS) service, and wherein a site of a base station serving the LTE cell is the same as a site of a base station serving the 2G/3G cell;
- a sending module, configured to: after the first receiving module receives the CSFB indication, send a measurement control message to the user equipment, wherein the measurement control message is used to instruct the user equipment to measure cell signal quality and send a corresponding event measurement report;
- a second receiving module, configured to receive the event measurement report sent by the user equipment; and
- a handover module, configured to, according to a receiving status of the event measurement report sent by the user equipment, select to complete CSFB handover by using blind handover, or select to complete CSFB handover by using measurement-base handover; wherein:

the sending module is configured to send a first measurement control message to the user equipment, wherein the first measurement control message is used to instruct the user equipment to measure signal quality of a current LTE cell and send a first event measurement report; and the handover module comprises:
- a determining unit, configured to determine whether the second receiving module receives the first event measurement report within a predetermined time,
- a third handover unit, configured to: when a determining result of the determining unit is the second receiving module receive the first event measurement report within a predetermined time, select to complete the CSFB handover by using the blind handover, and
- a fourth handover unit, configured to: when the determining result of the determining unit is the second receiving module does not receive the first event measurement report within a predetermined time, select to complete the CSFB handover by using the measurement-based handover.

10. The apparatus according to claim 9, wherein the third handover unit is configured to hand over the user equipment directly to a preconfigured blind handover neighboring cell of the current LTE cell.

11. The apparatus according to claim 9, wherein:
the sending module is further configured to: when the determining result of the determining unit is the second receiving module does not receive the first event measurement report within a predetermined time, send a second measurement control message to the user equipment, wherein the second measurement control message is used to instruct the user equipment to measure signal quality of the current LTE cell and a 2G/3G neighboring cell of the current LTE cell and send a second event measurement report; and
the fourth handover unit is configured to select, from the second event measurement report, a 2G/3G cell with best signal quality to perform handover.

12. A base station, comprising:
- a receiver, configured to receive a circuit switched fallback (CSFB) indication and an event measurement report sent by user equipment, wherein the CSFB indication indicates that the user equipment is handed over from an Long Term Evolution (LTE) cell to a 2G/3G cell to perform a circuit switched (CS) service, and wherein a site of a base station serving the LTE cell is the same as a site of a base station serving the 2G/3G cell;
- a sender, configured to send a measurement control message; and
- a processor, configured to: when the receiver receives the CSFB indication, control the sender to send the measurement control message to the user equipment, and according to a status of receiving, by the receiver, the event measurement report sent by the use equipment, select to complete CSFB handover by using blind handover, or select to complete CSFB handover by using measurement-based handover, wherein the measurement control message is used to instruct the user equipment to measure cell signal quality and send a corresponding event measurement report; wherein the processor configured to:

control the sender to simultaneously send a first measurement control message and a second measurement control message to the user equipment, wherein the first measurement control message is used to instruct the user equipment to measure signal quality of a current LTE cell and send a first event measurement report, and the second measurement control message is used to instruct the user equipment to measure signal quality of the current LTE cell and a 2G/3G neighboring cell of the current LTE cell and send a second event measurement report:

if the first event measurement report is first received, select to complete the CSFB handover by using the blind handover: and if the second event measurement report is first received, select to complete the CFSB handover by using the measurement-based handover.

13. A base station, comprising:
- a receiver, configured to receive a circuit switched fallback (CFSB) indication and an event measurement report sent by user equipment, wherein the CFSB indication indicates that the user equipment is handed over from an Long Term Evolution (LTE) cell to a 2G/3G cell to perform a circuit switched (CS) service, and wherein a site of a base station serving the LTE cell is the same as a site of a base station serving the 2G/3G cell;

a sender, configured to send a measurement control message; and a processor, configured to: when the receiver receives the CSFB indication, control the sender to send the measurement control message to the use equipment, and according to a status of receiving, by the receiver, the event measurement report sent by the user equipment, select to complete CSFB handover by using blind handover, or select to complete CSFB handover by using measurement-based handover, wherein the measurement control message is used to instruct the user equipment to measure cell signal quality and send a corresponding event measurement report; wherein the processor is configured to:

control the sender to send a first measurement control message to the user equipment, wherein the first measurement control message is used to instruct the user equipment to measure signal quality of a current LTE cell and send a first event measurement report;

determine whether the first event measurement report is received within a predetermined time;

if the first event measurement report is received within a predetermined time, select to complete the CSFB handover by using the blind handover; and if the first event measurement report is hot received within a predetermined time, select to complete the CSFB handover by using the measurement-based handover.

* * * * *